(12) United States Patent
Tanaka

(10) Patent No.: US 8,174,722 B2
(45) Date of Patent: May 8, 2012

(54) IMAGE FORMING APPARATUS AND CONTROL METHOD THEREOF

(75) Inventor: Tomoji Tanaka, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 973 days.

(21) Appl. No.: 10/963,516

(22) Filed: Oct. 14, 2004

(65) Prior Publication Data

US 2006/0007468 A1     Jan. 12, 2006

(30) Foreign Application Priority Data

Jul. 7, 2004    (JP) ................ 2004-200884

(51) Int. Cl.
- G06K 15/00    (2006.01)
- G06F 3/12    (2006.01)
- G06F 3/00    (2006.01)
- G06F 13/00    (2006.01)
- G03G 21/00    (2006.01)
- G03G 21/20    (2006.01)
- G03G 15/20    (2006.01)

(52) U.S. Cl. ............ 358/1.16; 358/1.15; 358/1.14; 358/1.13; 710/19; 710/10; 399/75; 399/70; 399/94; 711/147

(58) Field of Classification Search .......... 358/1.14, 358/1.15

See application file for complete search history.

(56) References Cited

U.S. PATENT DOCUMENTS

| | | | | |
|---|---|---|---|---|
| 5,408,589 A | * | 4/1995 | Yamamoto | 358/1.1 |
| 5,923,889 A | * | 7/1999 | Kim et al. | 713/323 |
| 6,542,411 B2 | * | 4/2003 | Tanikawa et al. | 365/185.33 |
| 6,734,986 B1 | * | 5/2004 | Kuroi et al. | 358/1.16 |
| 6,925,574 B2 | * | 8/2005 | Satoh | 713/323 |
| 6,939,227 B2 | * | 9/2005 | Jorasch et al. | 463/20 |
| 7,099,604 B2 | * | 8/2006 | Nishimoto et al. | 399/88 |
| 7,136,175 B2 | * | 11/2006 | Anderson et al. | 358/1.14 |
| 7,139,919 B2 | * | 11/2006 | Shiraga | 713/300 |
| 7,170,622 B2 | * | 1/2007 | Nobuhara et al. | 358/1.15 |
| 7,177,035 B2 | * | 2/2007 | Mitsudomi | 358/1.14 |

(Continued)

FOREIGN PATENT DOCUMENTS

JP    2001-209516 A    8/2001

(Continued)

OTHER PUBLICATIONS

Office Action issued in priority application on Jun. 27, 2006, and translation thereof.

*Primary Examiner* — Hilina S Kassa

(74) *Attorney, Agent, or Firm* — Buchanan Ingersoll & Rooney PC

(57) ABSTRACT

The present invention relates to an image forming apparatus that minimizes the consumption of power during physical formatting of the hard disk drive or the deletion of data therefrom and to a control method thereof. The image forming apparatus has a non-volatile storage unit that stores image data and a controller that executes at least one of the operations of initialization of the storage unit and deletion of the image data stored in the storage unit, and further includes as operating modes an image forming mode during which image formation is enabled and a power-saving mode during which power consumption is minimized, wherein the controller switches the operating mode to power-saving mode when initialization processing or image data deletion processing is begun.

16 Claims, 5 Drawing Sheets

U.S. PATENT DOCUMENTS

| | | | |
|---|---|---|---|
| 7,260,697 B2 * | 8/2007 | Okada | 711/166 |
| 7,281,088 B2 * | 10/2007 | Yamazaki et al. | 711/114 |
| 7,292,358 B2 * | 11/2007 | Ikegami et al. | 358/1.14 |
| 7,325,052 B1 * | 1/2008 | Motoyama | 709/223 |
| 7,826,078 B2 * | 11/2010 | Okamoto et al. | 358/1.15 |
| 2002/0140964 A1 * | 10/2002 | Goto et al. | 358/1.14 |
| 2002/0151347 A1 * | 10/2002 | Jorasch et al. | 463/20 |
| 2002/0171867 A1 | 11/2002 | Nobuhara et al. | |
| 2004/0042028 A1 * | 3/2004 | Mitsudomi | 358/1.14 |
| 2004/0190060 A1 * | 9/2004 | Funakawa et al. | 358/1.16 |

FOREIGN PATENT DOCUMENTS

| | | | |
|---|---|---|---|
| JP | 2001209516 A * | 8/2001 | |
| JP | 2001-277603 | 10/2001 | |
| JP | 2001-285600 | 10/2001 | |
| JP | 2002108145 A * | 4/2002 | |
| JP | 2003-037719 A | 2/2003 | |
| JP | 2003-125184 A | 4/2003 | |

* cited by examiner

IMAGE FORMING APPARATUS AND CONTROL METHOD THEREOF

RELATED APPLICATIONS

This application is based on application(s) No. 2004-200884, filed in Japan, the contents of which are hereby incorporated by reference.

BACKGROUND OF THE INVENTION

1. Field of the Invention

The present invention relates to an image forming apparatus that includes non-volatile storage means such as a hard disk drive and to a control method thereof, and relates more particularly to an image forming apparatus that minimizes the consumption of power during physical formatting of the hard disk drive or the deletion of data therefrom and to a control method thereof.

2. Description of the Prior Art

Many types of image forming apparatus that combine the various functions of a copier, fax machine, printer and the like have been commercialized in recent years. In such an image forming apparatus, several information terminal devices are connected over a network and large amounts of image information are input from these information terminal devices. In order to store these large amounts of input image information, the multifunction image forming apparatus must have a large-capacity storage device. Accordingly, the image forming apparatus has a non-volatile storage means such as a hard disk drive (hereinafter 'HDD') in addition to the volatile storage means used for image formation.

As such an HDD-equipped apparatus, an apparatus having an object of checking the consistency of the HDD management information when the power is turned ON in order to reduce the startup time has been disclosed (see, for example, Japanese Patent Application Laid-Open No. 2001-277603 or Japanese Patent Application Laid-Open No. 2001-285600). Specifically, in this apparatus, a temporary file storage area is made available when initialization thereof is completed, thereby enabling image processing functions to be performed. As a result, the amount of time required for the apparatus to reach operable status can be minimized.

In the conventional image forming apparatus, the storage capacity of the installed HDD is relatively small, such that initialization (physical formatting) of the HDD or deletion of all image data stored thereon (data clearing) can be carried out in a short period of time. Consequently, little concern has been given to the amount of power consumed during physical formatting or data clearing of the HDD included in the apparatus. However, increases in the number of functions handled by this type of apparatus and improvements in the processing capabilities thereof in recent years have required that the storage capacity of the HDD installed in the apparatus be increased accordingly, resulting in dramatic increases in such HDD capacity. As a result, the amount of time required for physical formatting and data clearing of the HDD has increased, thereby increasing the amount of power consumed during these operations.

An electrophotographic image forming apparatus in particular requires a heat fixing device to fix the toner onto the recording paper. A heat fixing device requires the consumption of a large amount of power even when it is on standby status. This is due to the fact that the heat rollers in the device must be continually maintained at a prescribed level in order to be able to carry out image formation on command. At the same time, image formation cannot be carried out during physical formatting or data clearing of the HDD. However, the heat rollers of the heat fixing device are nonetheless maintained in a high-heat state during this period, resulting in the consumption of a large amount of power.

The image forming apparatuses disclosed in Japanese Patent Application Laid-Open No. 2001-277603 or Japanese Patent Application Laid-Open No. 2001-285600 above have an object of reducing the time required to reach operability when the power to the apparatus is turned ON, and do not involve reducing the power consumption of the entire image forming apparatus during physical formatting or data clearing of the HDD.

BRIEF SUMMARY OF THE INVENTION

The present invention was devised in order to resolve the above problems with the conventional image forming apparatus. In other words, an object of the present invention is to provide an image forming apparatus and associated control method that limit the consumption of power during initialization processing and data clearing of a non-volatile storage unit such as an HDD and reduce the power consumption of the apparatus as a whole.

An image forming apparatus created to attain this object has a non-volatile storage unit that stores image data and a controller that executes at least one of the operations of initialization of the storage unit and deletion of the image data stored in the storage unit, and further includes as operating modes an image forming mode during which image formation is enabled and a power-saving mode during which power consumption is minimized, wherein the controller switches the operating mode to power-saving mode when initialization processing or image data deletion processing is begun.

In other words, the image forming apparatus of the present invention has a non-volatile storage unit that stores image data either temporarily or permanently. This non-volatile storage unit may comprise an HDD or a memory card, for example. Furthermore, the image forming apparatus can select as an operating mode an image forming mode during which image formation is enabled or a power-saving mode during which power consumption is minimized. When image forming mode is selected, because power is continually supplied to the heat fixing device, the operation panel and the like, a large amount of power is consumed. When power-saving mode is selected, on the other hand, because power is not supplied to the heat fixing device, the operation panel or the like, a small amount of power is consumed. The image forming apparatus is normally in image forming mode, such that image formation processing can be carried out immediately when desired.

The controller can perform initialization (physical formatting) of the storage unit. When initialization of the storage unit is begun, the power-saving mode is selected as the operation mode. In other words, during storage unit initialization processing, access to the storage unit is disabled and image formation cannot be carried out. As a result, the operation mode of the image forming apparatus is switched to the power-saving mode, thereby minimizing the consumption of power during storage unit initialization processing.

Access to the storage unit is disabled not only during initialization processing, but also when the image data stored in the storage unit is being deleted. In other words, access to the storage unit is disabled and image formation cannot be executed during image data deletion processing. When there is a large amount of image data stored in the storage unit, this deletion process is time-consuming. Consequently, it is preferred that the operation mode of the image forming apparatus be switched to the power-saving mode in order to minimize power consumption during image data deletion processing as well.

Furthermore, it is acceptable if the image forming apparatus of the present invention has a fixing unit that fixes images onto a recording medium and the supply of power to the fixing unit is halted when the operation mode is the power-saving mode. In other words, in an electrophotographic image forming apparatus, a fixing unit is required in order to fix the toner image onto the recording paper, but this fixing unit consumes a large amount of power. Therefore, when the supply of power to the fixing unit in particular is halted during the power-saving mode, the power-saving effect is considerable.

The control method of the image forming apparatus of the present invention is a control method of an image forming apparatus having as operation modes an image forming mode in which image formation can be carried out and a power-saving mode in which power consumption is minimized, and includes a step in which the commencement of initialization processing regarding a non-volatile storage unit that stores image data or the commencement of image data deletion processing therefrom is instructed, and a step in which the operation mode is switched to the power-saving mode when initialization processing or image data deletion processing is begun.

According to the present invention, when initialization of the storage unit or deletion of image data contained thereon is commenced, the operation mode of the image forming apparatus is switched to the power-saving mode. As a result, very little power is consumed during these processes even when they are time-consuming. Therefore, an image forming apparatus and associated control method can be provided in which the consumption of power during the initialization or data clearing processes of the non-volatile storage unit is minimized and the power consumption of the entire apparatus is reduced.

BRIEF DESCRIPTION OF THE SEVERAL VIEWS OF THE DRAWING

These and other objects and features of the present invention will become clear from the following description taken in conjunction with the preferred embodiments thereof with reference to the accompanying drawings, in which.

DETAILED DESCRIPTION OF THE INVENTION

A specific embodiment of the present invention is described in detail below with reference to the accompanying drawings. The embodiment is a color multifunction peripheral (color MFP) that has the functions of a copying machine and a printer and in which the present invention is applied.

Figure 1:
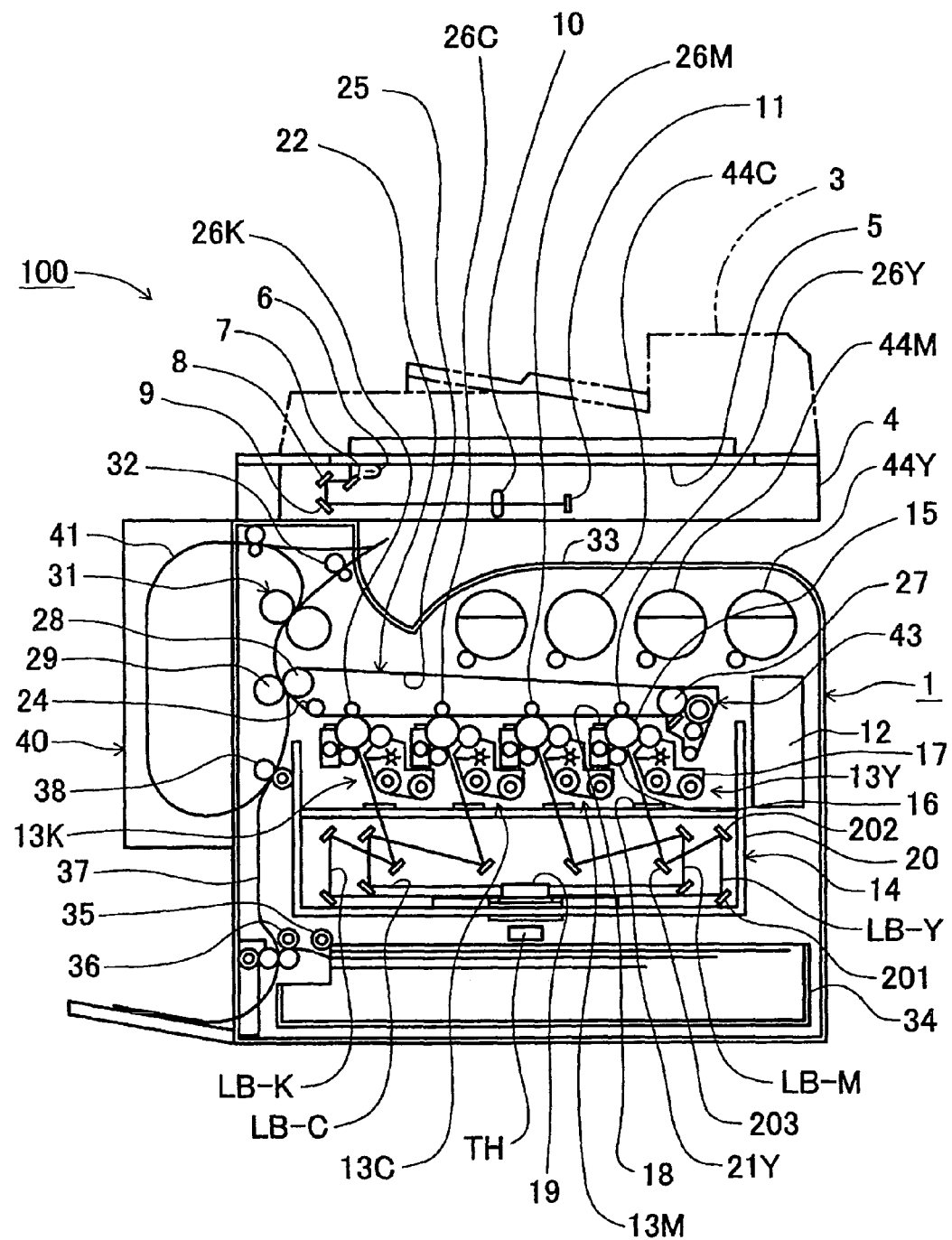
FIG. 1 is a cross-sectional view of a color multifunction peripheral pertaining to an embodiment of the present invention.

FIG. 1 shows a cross-sectional view of the main unit of a color MFP pertaining to an embodiment of the present invention. The color MFP 100 of this embodiment is a tandem-style full-color digital MFP, and forms color images using four image forming units that are disposed side by side as shown in FIG. 1. Specifically, the color MFP 100 of this embodiment includes an automatic document feeder 3 that automatically conveys individual pages of an original document, an image reader 4 that reads images of the original document, and an image forming device 1 that forms color images on recording paper. An operation panel and the like are disposed on the front of the MFP 100.

The image reader 4 includes a light source 6, a platen glass 5 on which an original document is placed, a reduction optical system comprising a full-rate mirror 7, half-rate mirrors 8 and 9 and an image forming lens 10, and an image reading element 11 that receives the light reflected off of the original document via the reduction optical system. This image reader 4 can read the light reflected off of the original document using the image reading element 11 based on a prescribed dot density (16 dots/mm in this embodiment).

The image forming device 1 has image forming units 13Y, 13M, 13C and 13K that respectively form toner images of yellow (Y), magenta (M), cyan (C) and black (K), and these image forming units are disposed side by side in the horizontal direction. The image forming units 13Y, 13M, 13C and 13K have the identical construction, and each include mainly a photoreceptor drum 15 that serves as the image carrier, a charger 16 that uniformly charges the surface of the photoreceptor drum 15, a developer 17 that develops the electrostatic latent image formed on the photoreceptor drum 15 using a prescribed color toner, and a cleaning device 18 that cleans off the surface of the photoreceptor drum 15. The image forming device 1 also has toner cartridges 44Y, 44M, 44C and 44K that supply various color toners to the developers.

The image forming device 1 also has a print head unit 14 that forms an electrostatic latent image for the prescribed color on the surface of each photoreceptor drum. The print head unit 14 emits laser beams LB-Y, LB-M, LB-C or LB-K in accordance with the gradation data. Furthermore, the print head unit 14 includes a polygon mirror 19 permitting deflection of each laser beam. It is also acceptable if each image forming unit has its own print head unit 14.

The image forming device 1 also includes an intermediate transfer belt unit 22. This intermediate transfer belt unit 22 has an intermediate transfer belt 25 and primary transfer rollers 26Y, 26M, 26C and 26K corresponding to the image forming units of each color, as well as a cleaning member 43 that removes the toner on the intermediate transfer belt 25. The intermediate transfer belt 25 is suspended with a certain level of tension over a drive roller 27, a backup roller 28 and a tension roller 24, and is driven to revolve at a prescribed speed by the drive roller 27, which is driven to rotate by a drive motor having superior constant-speed rotation capability.

The intermediate transfer belt 25 comprises a film formed from of pliable synthetic resin such as polyimide, for example, which is formed into a band and the ends of which are connected together to create a continuous belt.

The image forming device 1 also includes a secondary transfer roller 29, a fixing device 31, a paper eject tray 33, and a paper supply cassette 34. The secondary transfer roller 29 faces the backup roller 28 via the intermediate transfer belt 25, and carries out secondary transfer of the toner images composed of various overlapping colors onto the recording paper conveyed from the lower area to the upper area in FIG. 1. The fixing device 31 fixes the toner image onto the recording paper using heat and pressure.

The operation whereby the color MFP 100 is used as a copying machine will now be described. First, a page of an original document placed at a prescribed position in the automatic document feeder 3 is conveyed onto the platen glass 5 of the image reader 4. The reflected light image of the original document is read by the image reading element 11. The reflected light image of the original document thus read is sent to the image processor 12 of the image forming device 1 as original document data composed of the three colors of red (R), green (G) and blue (B) (each consisting of eight bits).

The image processor 12 performs image processing of the received original document data, such as shading correction, position correction, brightness/color space conversion, gamma correction, frame elimination and color/shift editing, and the post-processing image data is stored in the hard disk drive (HDD) described below. Furthermore, the image processor 12 creates gradation data for each of the colors of yellow (Y), magenta (M), cyan (C) and black (K) (each consisting of eight bits) based on this image data, and the gradation data for the various colors is sent to the print head unit 14.

In the print head unit 14, the timing used for semiconductor laser emission is modulated in accordance with the gradation data for each color, and a laser beam LB-Y, LB-M, LB-C or LB-K is emitted for each color in accordance with the gradation data. The emitted laser beams LB-Y, LB-M, LB-C or LB-K strike a rotating polygonal mirror 19. Each laser beam is deflected by the rotating polygonal mirror 19. When this occurs, the laser beams LB-Y and LB-M strike one surface of the rotating polygonal mirror 19 while the laser beams LB-C and LB-K strike a surface opposite the above surface. As a result, the laser beams LB-Y and LB-M are deflected by the rotating polygonal mirror 19 in the opposite direction from the laser beams LB-C and LB-K.

Of these laser beams, the laser beam LB-Y that corresponds to the yellow (Y) gradation data, for example, operates as described below. First, the laser beam LB-Y emitted from the semiconductor laser device strikes the rotating polygonal mirror 19. The laser beam LB-Y deflected by the rotating polygonal mirror 19 is reflected by the reflective mirrors 201, 202 and 203, and strikes the photoreceptor drum 15 of the image forming unit 13Y through a window 21Y. Consequently, an electrostatic latent image is formed on the photoreceptor drum 15 of the image forming unit 13Y. The same operation takes place with regard to the laser beams of the other colors, and electrostatic latent images are sequentially formed on the photoreceptor drums 15 corresponding to the various colors.

In the print head unit 14 of this embodiment, four laser beams LB-K, LB-Y, LB-M and LB-C emitted from four semiconductor lasers are guided to the rotating polygonal mirror 19 such that the laser beams for the image forming units 13Y and 13M and the laser beams for the image forming units 13C and 13K strike and are deflected by the surfaces of the polygonal mirror 19 that are disposed opposite from each other. Consequently, the laser beams LB-Y and LB-M that are deflected by a surface disposed on one side of the rotating polygonal mirror 19 and the laser beams LB-C and LB-K that are deflected by a surface disposed opposite from the above surface have mutually opposed scanning directions.

The electrostatic latent image formed on the photoreceptor drum 15 is developed as a toner image by each developer 17. The toner images sequentially formed on the various photoreceptor drums of the image forming units 13Y, 13M, 13C and 13K are sequentially transferred onto the intermediate transfer belt 25 by primary transfer rollers 26Y, 26M, 26C and 26K that are in pressure contact with the respective photoreceptor drums via the intermediate transfer belt 25. As a result, toner images of yellow (Y), magenta (M), cyan (C) and black (K) are transferred to the intermediate transfer belt 25 in an overlapping fashion.

The toner images transferred onto the intermediate transfer belt 25 undergo secondary transfer onto the recording paper by the secondary transfer roller 29. The recording paper on which the toner images are transferred is conveyed to the fixing device 31. The recording paper onto which the toner images are transferred undergoes fixing by the fixing device 31, and is ejected onto the paper eject tray 33 by an eject roller 32. As a result, a multi-color image is obtained.

In the color MFP 100 of this embodiment, recording paper housed in the paper supply cassette 34 is conveyed in the following manner. First, a sheet of paper of a prescribed size is conveyed toward the paper conveyance path 37 from the paper supply cassette 34 via the paper supply roller 35 and the paper separation conveyance roller 36. The sheet of recording paper supplied from the paper cassette 34 is conveyed to the nipping area of the resist rollers 38 and stops there. It is then conveyed toward the secondary transfer position according to a prescribed timing sequence. Secondary transfer, fixing and the like then take place, and the sheet of recording paper is ejected onto the paper eject tray 33.

Where two-sided copying is to be performed, the direction of conveyance is switched by a switching gate, such that a sheet of recording paper having toner images transferred onto one surface thereof is conveyed to the two-sided copying conveyance unit 40. The sheet of recording paper is then flipped over by conveyance rollers disposed along the conveyance path 41 and conveyed to the resist rollers 38 once more. The toner images are transferred onto the other side of the sheet of recording paper, which is then ejected onto the paper eject tray 33 via the fixing device 31.

When the color MFP 100 is used as a printer, image data sent from a PC (personal computer) connected via a network is input to the image processor 12. The image processor 12 carries out prescribed image processing of the received image data and creates gradation data based thereon. The gradation data thus created is sent to the print head unit 14. A multi-color image is thus obtained via the same operation performed when the MFP is used as a copying machine.

Figure 2:
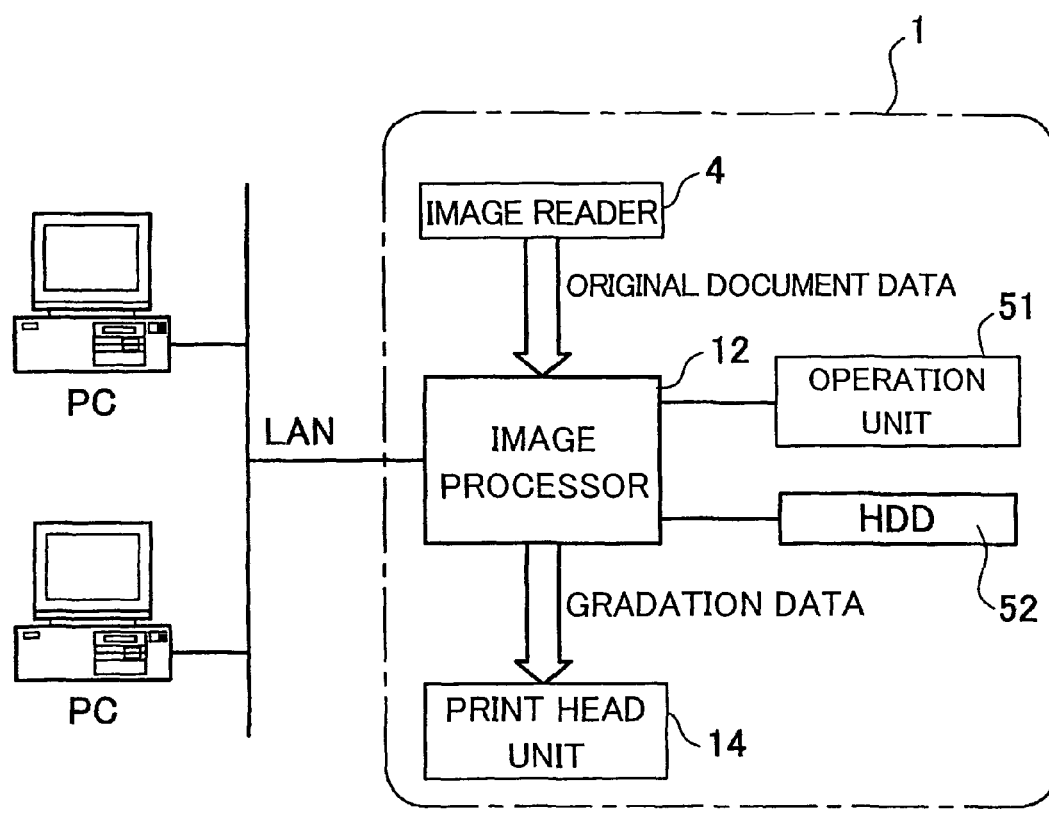
FIG. 2 is a block construction diagram of a color multifunction peripheral pertaining to an embodiment of the present invention.

FIG. 2 shows a function block diagram of the color MFP 100 of this embodiment. The color MFP 100 of this embodiment includes, as shown in FIG. 2, an operation unit 51 by which to perform image data input/output (I/O) operations and various parameter setting operations and a HDD 52 to temporarily or permanently store image data. System management information and the like are stored in the HDD 52 in addition to image data. The HDD 52 is described in detail below. The color MFP 100 is also connected to multiple PCs via a LAN (Local Area Network).

The image processor 12 also has an electric power control function for the entire apparatus as well as image processing functions. Specifically, when it is detected that the power switch is turned ON, the power supply system is controlled and the entire apparatus is booted. Electric power is supplied to the fixing device 31 simultaneously with the booting of the entire apparatus, and the entire apparatus is warmed up. It is necessary for the color MFP 100 to be able to perform a copy job or print job on command. In order to do so, the heat roller of the fixing device 31 must be maintained at a prescribed temperature, and therefore electric power is intermittently supplied to the fixing device 31.

The image processor 12 also has a function to switch the operation mode of the color MFP 100. The color MFP 100 has an image formation mode in which image formation is enabled (a state in which the maximum power consumption is 1500 W) and a power-saving mode to minimize power consumption (a state in which power consumption is 100 W or less). In the color MFP 100 of this embodiment, the image formation mode is normally set, and if no jobs or user operations are received for a prescribed period of time, the operation mode is switched to the power-saving mode. When a job or user operation is received, the operation mode is switched back to the image formation mode.

Specifically, in the image formation mode, electric power is supplied to the fixing device 31, as well as to various driving systems, the operation panel and other components. In the power-saving mode, on the other hand, power supply is stopped to the fixing device 31, which is in the standby state, and to the driving systems. Power supply to the circuit blocks in the control circuit that do not require power is also stopped, as is the control clock.

Figure 3:
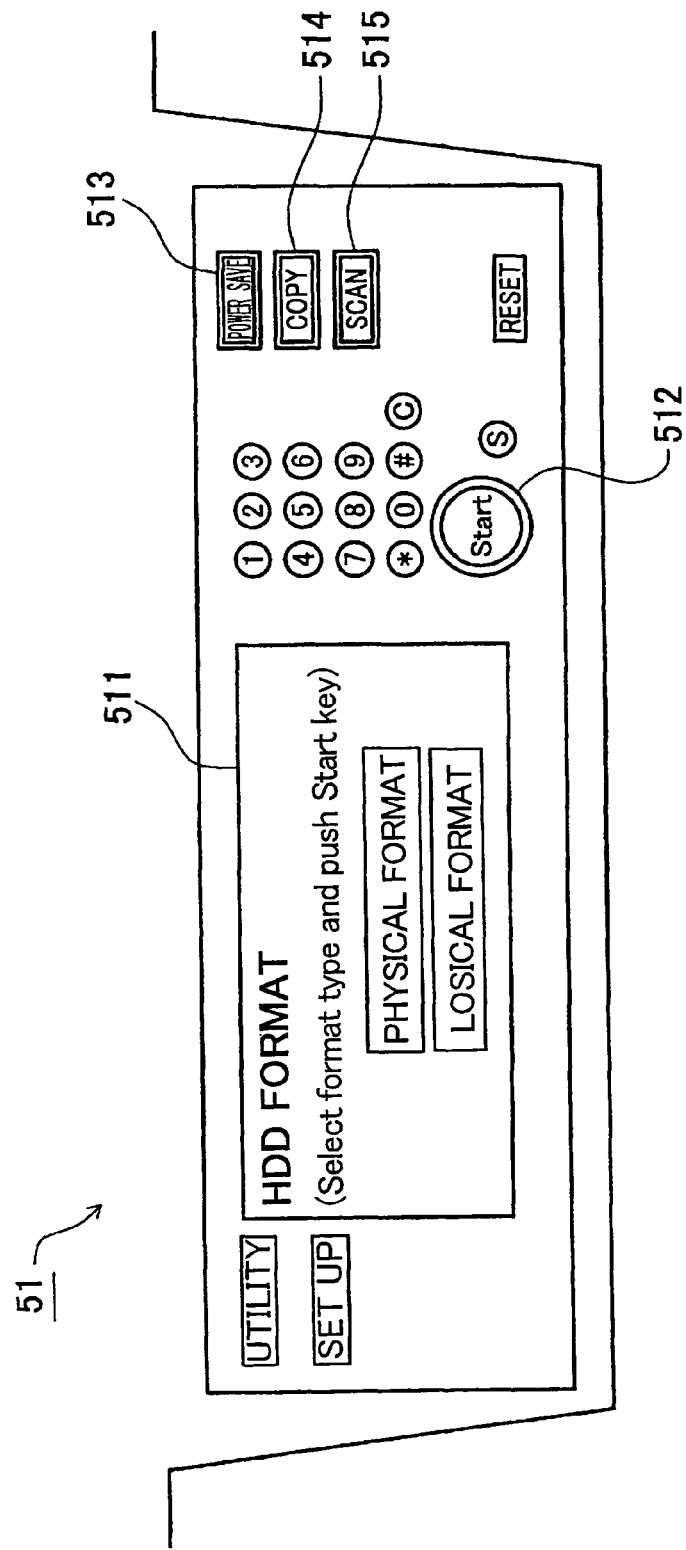
FIG. 3 shows an example of an LCD panel of an operation unit.

A liquid crystal panel 511 as shown in FIG. 3 that displays various functions and is used to perform various setting operations is disposed in the operation unit 51 of the color MFP 100. The display content of the liquid crystal panel 511 is changed automatically or via an operation by the user. The control of the liquid crystal panel 511 is carried out by the image processor 12.

A start button 512, a power-save button 513 that enables switching to the power-saving mode, and buttons that are used to set various functions, such as a copy button 154 that enables the setting of the copy function option and a scan button 515 that enables the setting of the scan function option, are disposed on the operation unit 51. The area around the start button 512 can be controlled to emit light using LEDs of two colors, i.e., green and orange. Control is carried out such that green light is emitted when the apparatus is in the state in which acceptance of jobs is permitted and orange light is emitted when the apparatus is in the state in which acceptance of jobs is prohibited.

The area around the power-save button 513 that forcibly switches the operation mode to the power-saving mode via user operation is controlled to emit light using an orange LED. When the operation mode is switched to the power-saving mode, the liquid crystal panel 511 is extinguished. At the same time, the LED for the power-save button 513 is OFF when the image formation mode is active, but turns ON when the operation mode is switched to the power-saving mode. This enables the user to recognize that the apparatus is in the power-saving mode.

The power-saving mode is cancelled when a button on the operation unit 51 is pressed, the liquid crystal panel 511 is touched, an original document is placed in the automatic document feeder 3, the paper supply cassette 34 is mounted or removed, or a job is received from the host computer, for example.

Figure 4:
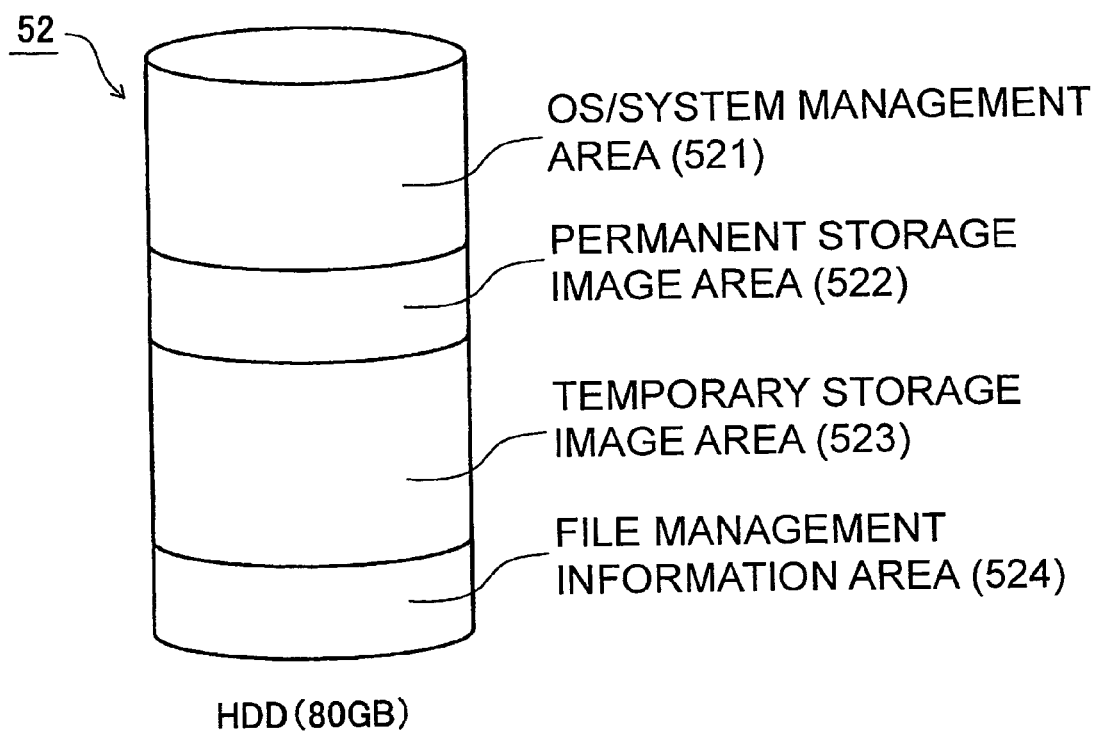
FIG. 4 shows an image of a storage area of a hard disk drive.

The HDD 52 included in the color MFP 100 will now be described with reference to FIG. 4. The HDD 52 has an 80-gigabyte storage capacity, and image data is stored in the storage area thereof, excluding the OS (Operating System)/system management area 521 and file management information area 524. The area in which image data is stored is divided into a permanent storage image area 522 (maximum 10 gigabytes) and a temporary storage image area 523 (maximum 40 gigabytes), and each of these areas is managed to ensure that the maximum storage capacities are not exceeded.

In the HDD 52, 512 bytes are deemed a physical basic unit (sector). In the HDD 52, multiple sectors are managed collectively by the OS as a logical basic unit (cluster). In other words, access to data stored in the HDD 52 is carried out on a cluster basis.

The control of the image processor 12 will now be described. In the description below, the control of the image processor 12 will be divided into control that is performed when the color MFP 100 is used as a copying machine, i.e., during image formation, and control that is performed when the color MFP 100 is started up.

The control that is performed when the color MFP 100 is used as a copying machine will first be described. Original document data is first sent from the image reader 4. The image processor 12 performs various types of image processing of the received original document data to create image data. The image data is then converted into compressed image data of known types such as JBIG (Joint Bi-level Image Experts Group), and the post-conversion compressed image data is stored in the HDD 52. Normally, the image data is stored in the temporary storage image area 523 of the HDD 52 for temporary storage. Where the compressed image data is to be permanently stored, the data is stored in the permanent storage image area 522 of the HDD 52.

Where the color MFP 100 is used as a printer, image data is sent from a PC or host computer connected over a LAN. The image processor 12 converts the received image data into compressed image data, and stores the post-conversion compressed image data in the HDD 52 temporarily or permanently.

Regardless of whether the color MFP 100 is used as a copying machine or as a printer, the image processor 12 then reads the compressed image data from the HDD 52 and expands it. After subjecting the image data to prescribed image processing such as edge enhancement, smoothing and gradation reproduction, for example, the post-image processing data is sent to the print head 14 as gradation data. Subsequently, an image is output by the image formation units comprising the image forming device 1 performing the operations described above.

The control that is performed upon startup of the color MFP 100 will now be described. When power to the color MFP 100 is turned ON, it is checked whether or not the HDD 52 is physically formatted. Where the HDD 52 is not physically formatted, a warning message indicating that the HDD needs to be physically formatted is displayed on the liquid crystal panel 511 of the operation panel 51. In other words, the user is warned that the HDD 52 needs to be physically formatted. The user then begins physical formatting of the HDD 52, after which logical formatting of the HDD 52 is performed. By thereafter re-starting the color MFP 100, the HDD 52 becomes enabled for use.

Physical formatting of an HDD is time-consuming. For example, where the storage capacity is 80 gigabytes, as in the case of this embodiment, approximately one hour is needed for physical formatting. Logical formatting consists simply of the writing of data unique to the color MFP 100, and can be completed in a short period of time.

Figure 5:
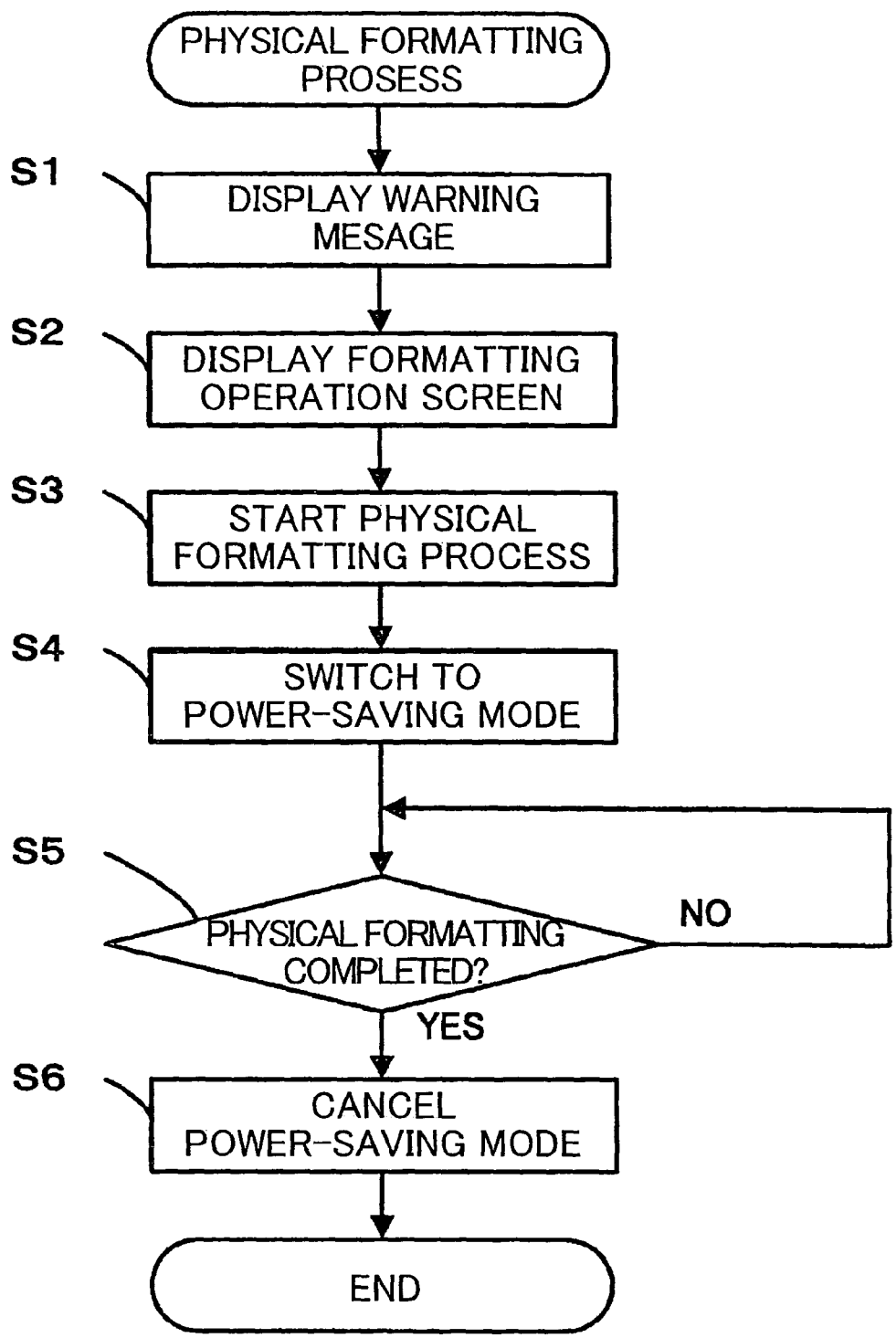
FIG. 5 is a flow chart showing the sequence of operations of a mode switching process in connection with a physical formatting operation.

The physical formatting process of the HDD 52 of the color MFP 100 will now be described with reference to the flow chart of FIG. 5. In the color MFP 100, when it is detected that the HDD 52 not physically formatted, a warning message indicating that the HDD needs to be physically formatted is displayed on the liquid crystal panel 511 of the operation unit 51 (S1). When the user performs an operation indicating that he viewed the warning message, the display content on the liquid crystal panel 511 is switched to an HDD formatting operation screen (see FIG. 3) (S2).

The user then selects a physical format and presses the start button 512, which begins the physical formatting process (S3). Specifically, the entire area of the HDD is checked for bad sectors, and zero data or the like is written in the HDD. In the example of the formatting operation screen shown in FIG. 3, a logical format can also be selected in addition to a physical format, but it is also acceptable if selection of a logical format is disabled when an HDD that is not physically formatted is detected.

After the physical formatting process is begun, the operation mode of the color MFP 100 is automatically switched from the image formation mode to the power-saving mode (S4). After the operation mode is switched to the power-saving mode, the apparatus stands by in that mode until the physical formatting process is completed (S5: NO). Where an operation to cancel the power-saving mode is performed during physical formatting of the HDD 52, the liquid crystal panel 511 is turned ON to display a message indicating that physical formatting of the HDD is underway. When this occurs, the power-saving mode is not completely cancelled, and only the liquid crystal panel 511 is turned ON. The liquid crystal panel 511 is turned OFF again after several seconds.

When the physical formatting process is completed (S5: YES), the power-saving mode is cancelled and the operation mode is switched back to the image formation mode (S6). The operation mode may be switched back to the image formation mode at any time after the completion of the physical formatting process. In other words, it can be switched back immediately after the completion of the physical formatting process or after execution or occurrence of an operation to cancel the power-saving mode after the completion of the physical formatting process, such as by pressing a button on the operation unit 51, touching the liquid crystal panel 511, mounting or removing the paper supply cassette 34, or receiving a job from the host computer.

In the description given above, the process in which the operation mode is switched to the power-saving mode at the time of initialization (physical formatting) of the HDD 52 is described, but the time at which the operation mode is switched to the power-saving mode is not limited to the initialization of the HDD 52. In other words, the operation mode should be switched to the power-saving mode if image formation is not enabled for an extended period of time. For example, when the HDD 52 is to be discarded, all image data stored in the HDD 52 may be deleted, i.e., data clearing may be carried out, in order to prevent internal confidential information or similar important information from being divulged. The control to switch to the power-saving mode should also be performed during this data clearing of the HDD 52 in the same manner as during the physical formatting of the HDD 52.

As described in detail above, in the color MFP 100 of this embodiment, the operation mode is switched to the power-saving mode when physical formatting or data clearing of the HDD 52 is commenced. When this power-saving mode is activated, power supply is stopped to the fixing device 31, which is in the standby state, as well as to the driving systems, and the liquid crystal panel 511 of the operation unit 51 is extinguished. Consequently, wasteful power consumption during physical formatting or data clearing of the HDD 52 is minimized. As a result, energy conservation in the workplace can be achieved. Therefore, an image forming apparatus and its associated control method in which wasteful power consumption by the non-volatile storage unit during initialization or data clearing is minimized, thereby achieving energy conservation for the entire apparatus.

The embodiment is only an example, and does not limit the present invention in any way whatsoever. Therefore, the present invention can be naturally improved and/or modified within the essential scope thereof. For example, the present invention is applied in a color MFP in the embodiment described above, but the implementation of the present invention is not limited thereto. It can be applied in a copying machine, a printer, a scanner, a facsimile machine or a word processor. The apparatus need not be color-capable, and may be capable of only monochrome image formation. In addition, the apparatus need not be a tandem-style apparatus, and can be a four-cycle style apparatus, for example.

What is claimed is:

1. An image forming apparatus comprising:
a non-volatile storage unit storing image data, and
a controller capable of:
setting an operation mode of the image forming apparatus to either an image forming mode for image formation or a power-saving mode for reducing power consumption;
receiving an instruction from a user to start initialization processing for the non-volatile storage unit;
starting initialization processing for the non-volatile storage unit in response to receipt of the instruction to start initialization processing for the non-volatile storage unit; and
switching the operation mode to the power-saving mode in response to receipt of the instruction to start initialization processing for the non-volatile storage unit,
wherein the controller does not cancel the power-saving mode when an operation to cancel the power-saving mode is executed by a user during the initialization processing for the non-volatile storage unit.

2. The image forming apparatus according to claim 1, further comprising a fixing unit for fixing a toner image on a recording medium, wherein power supplied to the fixing unit is reduced in the power-saving mode.

3. The image forming apparatus according to claim 1, wherein
the non-volatile storage unit is a hard disk drive, and
initialization processing for the non-volatile storage unit comprises physical formatting of the hard disk drive.

4. The image forming apparatus according to claim 1 further comprising:
an operation unit, for carrying out image data I/O operations and parameter setting operations, and for displaying a message indicating that the initialization processing for the non-volatile storage unit is underway when the operation to cancel the power-saving mode is executed by the user during the initialization processing for the non-volatile storage unit.

5. An image forming apparatus comprising:
a non-volatile storage unit storing image data, and
a controller capable of:
setting an operation mode of the image forming apparatus to either an image forming mode for image formation, or a power-saving mode for reducing power consumption;
receiving an instruction from a user to start image data deletion processing for the non-volatile storage unit;
starting image data deletion processing for the non-volatile storage unit in response to receipt of the instruction to start image data deletion processing for the non-volatile storage unit; and
switching the operation mode to the power-saving mode in response to receipt of the instruction to start image data deletion processing for the non-volatile storage unit,
wherein the controller does not cancel the power-saving mode when an operation to cancel the power-saving mode is executed by a user during the image data deletion processing for the non-volatile storage unit.

6. The image forming apparatus according to claim 5, further comprising a fixing unit for fixing a toner image on a recording medium, wherein power supplied to the fixing unit is reduced in the power-saving mode.

7. The image forming apparatus according to claim 5, wherein
the non-volatile storage unit is a hard disk drive.

8. The image forming apparatus according to claim 5 further comprising:
an operation unit, for carrying out image data I/O operations and parameter setting operations, and displaying a message indicating that the image data deletion processing is underway when the operation to cancel the power-saving mode is executed by the user during the image data deletion processing for the non-volatile storage unit.

9. A control method of an image forming apparatus having an image forming mode for image formation and a power-saving mode for reducing power consumption as operating mode and a non-volatile storage unit storing image data, comprising:
receiving an instruction from a user to start initialization processing for the non-volatile storage unit;
starting initialization processing for the non-volatile storage unit in response to receipt of the instruction to start initialization processing for the non-volatile storage unit; and
switching the operation mode to the power-saving mode in response to receipt of the instruction to start initialization processing for the non-volatile storage unit,
wherein, when an operation to cancel the power-saving mode is executed by a user during the initialization processing for the non-volatile storage unit, the power-saving mode is not canceled.

10. The control method of an image forming apparatus according to claim 9, wherein the image forming apparatus has a fixing unit for fixing a toner image to a recording medium, further comprising: reducing power supplied to the fixing unit.

11. The control method of an image forming apparatus according to claim 9, wherein
the non-volatile storage unit is a hard disk drive, and the initialization processing for the non-volatile storage unit comprises physical formatting of the hard disk drive.

12. The control method of an image forming apparatus according to claim 9 further comprising:
indicating that the initialization processing is underway when the operation to cancel the power-saving mode is executed by the user during the initialization processing.

13. A control method of an image forming apparatus having an image forming mode for image formation and a power-saving mode for reducing power consumption as operating mode and a non-volatile storage unit storing image data, comprising:
receiving an instruction from a user to start image data deletion processing for the non-volatile storage unit;
starting image data deletion processing for the non-volatile storage unit in response to receipt of the instruction to start image data deletion processing for the non-volatile storage unit; and
switching the operation mode to the power-saving mode in response to receipt of the instruction to start image data deletion processing for the non-volatile storage unit,
wherein, when an operation to cancel the power-saving mode is executed by a user during the image data deletion processing for the non-volatile storage unit, the power-saving mode is not canceled.

14. The control method of an image forming apparatus according to claim 13, wherein the image forming apparatus has a fixing unit for fixing a toner image to a recording medium, further comprising: reducing power supplied to the fixing unit.

15. The control method of an image forming apparatus according to claim 13, wherein the non-volatile storage unit is a hard disk drive.

16. The control method of an image forming apparatus according to claim 13, further comprising:
indicating that the image data deletion processing is underway when the operation to cancel the power-saving mode is executed by the user during the image data deletion processing for the non-volatile storage unit.

* * * * *